US005320913A

United States Patent [19]

Morimoto et al.

[11] Patent Number: 5,320,913

[45] Date of Patent: Jun. 14, 1994

[54] CONDUCTIVE FILM AND LOW REFLECTION CONDUCTIVE FILM, AND PROCESSES FOR THEIR PRODUCTION

[75] Inventors: Takeshi Morimoto; Kazuya Hiratsuka; Keiko Kubota; Satoshi Takemiya; Keisuke Abe; Takeshi Yoshizuka, all of Yokohama, Japan

[73] Assignee: Asahi Glass Company Ltd., Tokyo, Japan

[21] Appl. No.: 7,709

[22] Filed: Jan. 22, 1993

[30] Foreign Application Priority Data

Jan. 24, 1992 [JP] Japan .................................. 4-034463
Feb. 12, 1992 [JP] Japan .................................. 4-059041

[51] Int. Cl.⁵ ................................................ B32B 9/00

[52] U.S. Cl. .................................... 428/688; 252/519; 428/689; 428/697; 428/699; 428/702; 313/503

[58] Field of Search ............... 428/426, 432, 688, 689, 428/693, 694 DE, 697, 699; 313/478, 479, 503, 509; 252/501.1, 518, 520, 521

[56] References Cited

U.S. PATENT DOCUMENTS

| | | | |
|---|---|---|---|
| 4,075,449 | 2/1978 | Yagi et al. | 313/509 |
| 4,464,647 | 8/1984 | Yokomizo et al. | 252/518 |
| 5,025,490 | 6/1991 | Tamura | 313/479 |
| 5,045,235 | 9/1991 | Ohara | 428/701 |
| 5,051,652 | 9/1991 | Isomura | 313/478 |

FOREIGN PATENT DOCUMENTS

| | | |
|---|---|---|
| 0197584 | 10/1986 | European Pat. Off. . |
| 0372488 | 6/1990 | European Pat. Off. . |
| 5837915 | 9/1984 | Japan . |

OTHER PUBLICATIONS

Patent Abstracts of Japan, vol. 14, No. 133 (E-902), Mar. 13, 1990, JP-A-02 001 104, Jan. 5, 1990.

Patent Abstracts of Japan, vol. 12, No. 201 (M-707), Jun. 10, 1988, JP-A-63 005 990, Jan. 11, 1988.

Hodes et al., "Heterojunction Silicon/Indium Tin Oxide Photoelectrodes," J. Am. Chem. Soc. 1983, 105, 324–330.

*Primary Examiner*—Patrick J. Ryan
*Assistant Examiner*—Patrick Jewik
*Attorney, Agent, or Firm*—Oblon, Spivak, McClelland, Maier & Neustadt

[57] ABSTRACT

A conductive film consisting essentially of oxides of Ru and In.

4 Claims, No Drawings

CONDUCTIVE FILM AND LOW REFLECTION CONDUCTIVE FILM, AND PROCESSES FOR THEIR PRODUCTION

The present invention relates to a conductive film or a low reflection conductive film suitable for being coated on the surface of a glass substrate such as a face panel of a cathode ray tube and processes for their production.

A cathode ray tube is operated at a high voltage, whereby static electricity is induced on the surface of the face panel of the cathode ray tube at the initiation or termination of the operation. By this static electricity, a dust is likely to deposit on the surface to deteriorate the contrast, or an unpleasant electrical shock is likely to be felt when a finger or the like is directly touched to the face panel.

Heretofore, some attempts have been made to apply an antistatic film on the surface of the face panel of a cathode ray tube to prevent such drawbacks. For example, as disclosed in Japanese Unexamined Patent Publication No. 76247/1988, a method has been adopted wherein a conductive oxide layer of e.g. tin oxide or indium oxide is formed by a chemical vapor deposition method while heating the surface of the face panel of the cathode ray tube to a temperature of about 350° C. However, in addition to the costs of the apparatus, this method had a problem such that as the cathode ray tube was heated at a high temperature, the phosphor coated in the cathode ray tube tended to fall off, and the dimensional precision tended to deteriorate. As the material to be used for a conductive layer, tin oxide was most common, but in such a case, it was hardly possible to obtain a high performance film by a low temperature treatment.

In recent years, interference of electromagnetic noises to electronic equipments has become a social problem. To prevent such a problem, there has been preparation of standards and regulations. Electromagnetic noises are regarded as problematic since they are likely to cause a skin cancer by an electrostatic charge on the face panel of a cathode ray tube, they are likely to give an influence over a fetus by a low frequency electromagnetic field (ELF), and they are likely to be hazardous by X-rays or ultraviolet rays. In such a case, by the presence of a conductive coating film, when the electromagnetic waves impinge on the conductive coating film, an eddy current will be produced in the coating film, and the electromagnetic waves will be reflected by this action. However, for this purpose, good electrical conductivity at a level of a metal and durability against a high electrical field intensity, are required. However, it has been difficult to obtain a film having such good conductivity.

Further, with respect to a method of coating a low reflection film, many studies have been made on not only optical equipments but also consumer equipments, particularly cathode ray tubes (CRT) for televisions or computer terminals.

As a conventional method, it has been common, for example, to provide a $SiO_2$ layer having fine roughness on the surface in order to provide an anti-glare effect to the surface of the face panel of a cathode ray tube, as disclosed in Japanese Unexamined Patent Publication No. 118931/1986, or to provide surface roughness by etching of the surface with hydrofluoric acid. However, such a method is so-called non-glare treatment to scatter exterior lights and is not essentially a means to provide a low reflection layer, whereby reduction of the reflectance is rather limited, and in the case of a cathode ray tube, such tends to cause a deterioration of the resolution.

The present inventors have previously proposed a conductive film consisting essentially of ruthenium oxide as a conductive film which is able to solve the above drawbacks inherent to the prior art. However, the conductive film consisting essentially of ruthenium oxide is colored, whereby transmittance of visual lights tends to be low, such being undesirable depending upon the particular use. It is an object of the present invention to provide anew a conductive film having high transmittance of visual lights and high electrical conductivity and a low reflection conductive film having high performance as well as processes for their production.

The present invention has been made to solve the above-mentioned problems and provides a conductive film containing ruthenium oxide and indium oxide, which is suitable particularly to be coated on a glass substrate such as a face panel of a cathode ray tube, and a high performance low reflection conductive film of at least two layers, which comprises such a conductive film on the substrate side and a film having a refractive index lower than the conductive film, on the air side.

Further, the present invention provides a process for producing a conductive film, which comprises coating, on a substrate such as a glass substrate of a face panel of a cathode ray tube, a coating solution containing a Ru compound and an In compound capable of forming Ru oxide and In oxide, respectively, in water and/or an organic solvent, followed by heating, preferably at a temperature of from 100° to 500° C., and a process for producing a low reflection conductive film on a glass substrate such as a face panel of a cathode ray tube, which comprises forming a low refractive index film on such a conductive film. Further, the present invention provides a process for producing a conductive film, which comprises coating, on a glass substrate such as a face panel of a cathode ray tube, a solution prepared by adding at least one member selected from the group consisting of a Si compound, a Ti compound, a Zr compound, an Al compound and a Sn compound to a coating solution comprising a Ru compound capable of forming Ru oxide and an In compound capable of forming In oxide and water and/or an organic solvent, followed by heating at a temperature of from 100° to 500° C., and a process for producing a low reflection conductive film on a glass substrate such as a face panel of a cathode ray tube, which comprises forming a low refractive index film on such a conductive film.

Now, the present invention will be described in detail with reference to the preferred embodiments.

The ruthenium compound to be used for the coating solution of the present invention is not particularly limited, so long as it is capable of forming ruthenium oxide when heated. For example, it may be at least one member selected from the group consisting of a salt such as ruthenium chloride or ruthenium nitrate, Ru forming a complex with a $\beta$-diketone or a ketoester, a salt of such Ru, ruthenium red, a hexaanmine ruthenium(III) salt, a pentaanmine (dinitrogen) ruthenium(II) salt, a chloropentaanmine ruthenium(III) salt, cisdichlorotetraanmine ruthenium(III) chloride monohydrate, a tris(ethylenediamine)ruthenium(II) salt, ruthenium acetate, ruthenium bromide, ruthenium fluoride, and hydrolyzates thereof.

As the solvent for the coating solution, water or an organic solvent may be mentioned. As a hydrophilic organic solvent, an alcohol such as methanol, ethanol, propanol or butanol, or an ether such as ethyl cellosolve, may optionally be used.

The indium compound to be used in the present invention, is not particularly limited so long as it is capable of forming indium oxide when heated. For example, it may be an inorganic salt such as indium chloride or indium nitrate, an organic salt such as indium octylate or indium naphthenate, an alkoxide such as tributoxyindium or triethoxyindium, a complex having a β-diketone such as acetyl acetone or a ketoester such as methylacetyl acetonate coordinated, or an organic indium compound.

Further, in order to improve the adhesion strength and hardness of the film, it is possible to add to the coating solution used in the present invention, a solution containing a silicon compound capable of forming $SiO_2$ when heated, such as $Si(OR)_y \cdot R'(4-y)$ wherein y is 3 or 4, and each of R and R' is an alkyl group, or a partial hydrolyzate thereof. As a catalyst for the hydrolysis HCl, $HNO_3$ or $CH_3COOH$ may, for example, be employed. Further, various surfactants may be added to improve the wettability with the substrate.

Furthermore, in order to adjust the refractive index of the conductive film, it is possible to mix to the coating solution one or more of a Ti compound, a Zr compound, an Al compound and a Sn compound which are capable of forming $TiO_2$, $ZrO_2$, $Al_2O_3$ or $SnO_2$, respectively, when heated. As such compounds of Ti, Zr, Al and Sn, alkoxides and metal salts of these metals as well as hydrolyzates thereof may be used.

In the coating solution, the Ru compound and the In compound may be mixed at an optional ratio. The larger the ratio of $RuO_2/In_2O_3$ as calculated as oxides, the higher the electrical conductivity. However, if $RuO_2$ is too much, the transmittance deteriorates. Therefore, the weight ratio of $RuO_2/In_2O_3$ is preferably at a level of from 8/2 to 1/9.

The ruthenium compound, the indium compound and the silicon compound may be mixed at an optional ratio. However, in view of the film strength and production of electrical conductivity, the mixing ratio (weight ratio) as calculated as $(RuO_2 + In_2O_3)/SiO_2$ is preferably from 1/6 to 20/1, more preferably from 1/4 to 10/1. Further, the solid content in the solution is usually from 0.05 to 10 wt %, preferably from 0.3 to 5.0 wt %. If the concentration is too high, the storage stability of the solution will be poor. On the other hand, if the concentration is too low, the film thickness will be thin, whereby no adequate electrical conductivity can be obtained.

The method for coating such a coating solution onto the substrate is not particularly limited. Spin coating, dip coating or spray coating may, for example, be preferably employed. Further, spray coating may be employed to form surface roughness on the surface to provide an anti-glare effect as well. In such a case, a hard coating such as a silica coating film may be formed on the conductive film as the product of the present invention.

In the present invention, the solution containing the Ru compound and the In compound, can be applied by itself as a coating solution onto the substrate. Therefore, in a case where a solvent having a low boiling point is used, a uniform film can be obtained by drying at room temperature. When a solvent having a high boiling point is used, or when it is desired to improve the strength of the film, the coated substrate is heated. The upper limit of the heating temperature is determined depending upon the softening point of glass or plastic material to be used for the substrate. Taking also this point into consideration, a preferred temperature range is from 100° to 500° C.

In the present invention, a low reflection conductive film can be prepared by utilizing the interference of lights. For example, when the substrate is made of glass (refractive index $n = 1.52$), the reflectance can be minimized by forming a low refractive index film on the above conductive film so that the ratio of $n_1$ (conductive film)/$n_2$ (low refractive index film) is about 1.23.

The low refractive index film as the outermost layer of the low reflection conductive film composed of such two layers, can be formed by means of at least one solution selected from the group consisting of a solution containing $MgF_2$ sol and a solution containing a Si compound such as a Si alkoxide which is capable of forming $SiO_2$ when heated. From the viewpoint of the refractive index, $MgF_2$ has the lowest refractive index among such materials. Accordingly, it is preferred to employ a solution containing $MgF_2$ sol in order to reduce the reflectance. However, from the viewpoint of the hardness or scratch resistance of the film, a film comprising $SiO_2$ as the main component, is preferred.

As such a solution containing a Si compound for forming the low refractive index film, various solutions may be used. It may, for example, be a solution containing a Si alkoxide of the formula $Si(OR)_m R'n$ wherein m is from 1 to 4, n is from 0 to 3, and each of R and R' a $C_{1-4}$ alkyl group, or a partial hydrolyzate thereof. For example, a monomer or polymer of silicon ethoxide, silicon methoxide, silicon isopropoxide or silicon butoxide may preferably be used.

Such a Si alkoxide may be used as dissolved in an alcohol, an ester or an ether. Further, hydrochloric acid, nitric acid, acetic acid, hydrofluoric acid or aqueous ammonia may be added to such a solution so that it is used as hydrolyzed. The Si alkoxide is preferably at most 30 wt % relative to the solvent. Further, to this solution, an alkoxide of e.g. Zr, Ti or Al, or a partial hydrolyzate thereof may be added to improve the film strength, so that at least one member or a composite of at least two members of $ZrO_2$, $TiO_2$ and $Al_2O_3$ may be precipitated at the same time as $MgF_2$ and $SiO_2$. Further, a surfactant may be added in order to improve the wettability with the substrate. The surfactant to be added, may, for example, be a sodium linear alkylbenzene sulfonate or an alkyl ether sulfate.

The process for producing a low reflection conductive film of the present invention can be applied to a low reflection conductive film by means of a multilayer interference effect. Known as typical examples of the multilayer low reflection film having a reflection preventing ability are a double layer low reflection film having a high refractive index layer-a low refractive index layer formed in an optical thickness of $\lambda/2 - \lambda/4$ from the substrate side, where $\lambda$ is the wavelength of light to be prevented from reflection, a three layer low reflection film having an intermediate refractive index layer-a high refractive index layer-a low refractive index layer formed in an optical thickness of $\lambda/4-\lambda/2-\lambda/4$ from the substrate side, and a four layer low refraction film having a low refractive index layer-an intermediate refractive index layer-a high reflective index layer-a low refractive index layer formed from the substrate side.

The substrate on which the conductive film or the low reflection conductive film of the present invention is to be formed, may be various glass or plastic substrates such as a face panel of a cathode ray tube, a glass plate for a copying machine, a panel for a calculator, a glass sheet for a clean room and a front sheet of a display device such as CRT or LCD.

With a film having electrical conductivity imparted solely by $RuO_2$, the visible light transmittance decreases substantially against non-treated glass. Here, by the combination of $In_2O_3$ to $RuO_2$, the visible light transmittance can be increased by from 10 to 25%, although the electrical conductivity may decrease to some extent.

When a transparent oxide other than $In_2O_3$ (such as an oxide of Sn, Ti or Al) is combined with $RuO_2$, the surface resistance would be higher by about hundreds times than the $RuO_2$—$In_2O_3$ system, when the composition in combination with $RuO_2$ is adjusted so that the transmittance and the reflectance would be equal to the $RuO_2$—$In_2O_3$ system. Thus, the present invention provides a conductive film having high transmittance and high electrical conductivity by the combination of $RuO_2$ and $In_2O_3$.

Now, the present invention will be described in further detail with reference to Examples. However, it should be understood that the present invention is by no means restricted to such specific Examples.

In the following Examples and Comparative Examples, the films obtained were evaluated by the following methods.

1) Evaluation of electrical conductivity

The surface resistance of the film surface was measured by a Roresta resistance measuring apparatus (manufactured by Mitsubishi Petrochemical Co., Ltd.).

2) Scratch resistance

The film surface was scratched 200 times in reciprocation under a load of 1 kg (50—50, manufactured by Lyon), whereupon the scratching on the surface was visually evaluated. The evaluation standards were as follows.

○: No scratching

Δ: Some scratching

X: The film is partially peeled.

3) Pencil hardness

The film surface was scratched with pencil under a load of 1 kg, whereby the hardness of the pencil where a scratch mark was started to be observed on the surface, was taken as the pencil hardness of the film.

4) Luminous reflectance

The luminous reflectance of a multilayer film of from 400 to 700 nm was measured by a GAMMA spectral reflectance spectrum measuring apparatus.

EXAMPLE 1

$RuCl_3 \cdot nH_2O$ was dissolved in ethanol so that the concentration would be 3 wt % as $RuO_2$. This solution is designated as solution A. Indium chloride was dissolved in ethanol so that the concentration would be 3 wt % as $In_2O_3$. This solution was designated as solution B. Ethyl silicate was dissolved and hydrolyzed with an aqueous HCl solution, so that the concentration would be 3 wt % as $SiO_2$. This solution was designated as solution C.

Solutions, A, B and C were mixed so that $RuO_2$, $In_2O_3$ and $SiO_2$ as calculated as oxides would be as identified in Table 1. The solution thus obtained was coated on a glass disk surface of 70 mm in diameter by spin coating for 5 seconds at a rotational speed of 2,000 rpm and then heated at 450° C. for 10 minutes. Further, on this film, solution C was coated by spin coating for 5 seconds at a rotational speed of 1,050 rpm, and then heated at 450° C. for 10 minutes. The results are shown in Table 1.

TABLE 1

| No. | $RuO_2$ (wt %) | $In_2O_3$ (wt %) | $SiO_2$ (wt %) | Surface resistance (Ω/□) | Scratch resistance | Pencil hardness | Luminous reflectance (%) |
|---|---|---|---|---|---|---|---|
| 1 | 47 | 20 | 33 | $9.8 \times 10^3$ | ○ | 4H | 0.42 |
| 2 | 40 | 27 | 33 | $2.5 \times 10^4$ | ○ | 4H | 0.60 |
| 3 | 53 | 14 | 33 | $7.2 \times 10^3$ | ○ | 4H | 0.29 |
| 4 | 40 | 30 | 30 | $1.7 \times 10^4$ | ○ | 4H | 0.38 |
| 5 | 40 | 40 | 20 | $1.3 \times 10^4$ | ○ | 2H | 0.30 |
| 6 | 35 | 40 | 25 | $1.2 \times 10^5$ | ○ | 3H | 0.45 |
| 7 | 35 | 45 | 20 | $1.2 \times 10^4$ | ○ | 2H | 0.42 |
| 8 | 30 | 45 | 25 | $1.4 \times 10^5$ | ○ | 3H | 0.45 |
| 9 | 30 | 40 | 30 | $1.8 \times 10^5$ | ○ | 4H | 0.51 |
| 10 | 25 | 50 | 25 | $7.8 \times 10^5$ | ○ | 3H | 0.48 |
| 11 | 25 | 45 | 30 | $1.5 \times 10^6$ | ○ | 4H | 0.55 |
| 12 | 20 | 55 | 25 | $4.5 \times 10^7$ | ○ | 3H | 0.47 |
| 13 | 15 | 60 | 25 | $7.4 \times 10^9$ | ○ | 3H | 0.56 |

EXAMPLE 2

Indium chloride was dissolved in acetyl acetone so that acetyl acetone would be 8 times (molar ratio) of indium chloride, and the solution was refluxed at 140° C. for one hour. This solution was dissolved in ethanol so that the concentration would be 3 wt % as $In_2O_3$. This solution was designated as solution D. The subsequent operation was conducted in the same manner as in Example 1 except that solution B in Example 1 was changed to solution D. The results are shown in Table 2.

TABLE 2

| No. | $RuO_2$ (wt %) | $In_2O_3$ (wt %) | $SiO_2$ (wt %) | Surface resistance (Ω/□) | Scratch resistance | Pencil hardness | Luminous reflectance (%) |
|---|---|---|---|---|---|---|---|
| 14 | 40 | 27 | 33 | $5.0 \times 10^4$ | ○ | 5H | 0.50 |
| 15 | 40 | 40 | 20 | $9.0 \times 10^4$ | ○ | 3H | 0.33 |
| 16 | 35 | 40 | 25 | $2.1 \times 10^4$ | ○ | 4H | 0.45 |

TABLE 2-continued

| No. | $RuO_2$ (wt %) | $In_2O_3$ (wt %) | $SiO_2$ (wt %) | Surface resistance (Ω/□) | Scratch resistance | Pencil hardness | Luminous reflectance (%) |
|---|---|---|---|---|---|---|---|
| 17 | 35 | 45 | 20 | $1.1 \times 10^4$ | ○ | 3H | 0.38 |
| 18 | 30 | 45 | 25 | $1.1 \times 10^4$ | ○ | 4H | 0.47 |
| 19 | 30 | 50 | 20 | $9.8 \times 10^3$ | ○ | 3H | 0.35 |
| 20 | 25 | 45 | 30 | $6.8 \times 10^4$ | ○ | 4H | 0.55 |
| 21 | 25 | 50 | 25 | $7.6 \times 10^9$ | ○ | 3H | 0.48 |
| 22 | 24 | 36 | 40 | $8.5 \times 10^3$ | ○ | 3H | 0.42 |

EXAMPLE 3

$SnCl_4 \cdot nH_2O$ was dissolved in ethanol so that the concentration would be 3 wt % as $SnO_2$. The solution thus obtained was designated as solution E. Solutions A, B and E, or solutions A, B, C and E were mixed, and the subsequent operation was conducted in the same manner as in Example 1. The results are shown in Table 3.

TABLE 3

| No. | $RuO_2$ (wt %) | $In_2O_3$ (wt %) | $SiO_2$ (wt %) | $SnO_2$ (wt %) | Surface resistance (Ω/□) | Scratch resistance | Pencil hardness | Luminous reflectance (%) |
|---|---|---|---|---|---|---|---|---|
| 23 | 60 | 36 | 0 | 4 | $6.0 \times 10^3$ | Δ | HB | 0.98 |
| 24 | 50 | 45 | 0 | 5 | $1.2 \times 10^4$ | Δ | HB | 0.90 |
| 25 | 40 | 24 | 33 | 3 | $5.8 \times 10^4$ | ○ | 4H | 0.41 |
| 26 | 40 | 36 | 30 | 4 | $4.5 \times 10^4$ | ○ | 4H | 0.31 |

EXAMPLE 4

Indium chloride and $SnCl_4 \cdot nH_2O$ were dissolved in acetyl acetone so that the total molar amount of indium and tin would be ⅛ of the molar amount of acetyl acetone, and the solution was refluxed at 140° C. for one hour. This solution was dissolved in ethanol so that the concentration would be 3 wt % as calculated as $In_2O_3 + SnO_2$. This solution was designated as solution F. Solutions A and F, or solutions A, C and F, were mixed, and the subsequent operation was conducted in the same manner as in Example 1. The results are shown in Table 4.

TABLE 4

| No. | $RuO_2$ (wt %) | $In_2O_3$ (wt %) | $SiO_2$ (wt %) | $SnO_2$ (wt %) | Surface resistance (Ω/□) | Scratch resistance | Pencil hardness | Luminous reflectance (%) |
|---|---|---|---|---|---|---|---|---|
| 27 | 60 | 36 | 0 | 4 | $2.0 \times 10^3$ | Δ | HB | 0.97 |
| 28 | 50 | 45 | 0 | 5 | $7.2 \times 10^3$ | Δ | HB | 0.90 |
| 29 | 40 | 24 | 33 | 3 | $6.8 \times 10^3$ | ○ | 4H | 0.39 |
| 30 | 40 | 36 | 30 | 4 | $9.2 \times 10^3$ | ○ | 4H | 0.35 |

EXAMPLE 5

$Ti(C_5H_7O_2)_2(OC_3H_7)_2$ was dissolved in ethanol so that the concentration would be 3 wt % as $TiO_2$, and the solution was designated as solution G. The subsequent operation was conducted in the same manner as in Example 3 except that solution E in Example 3 was changed to solution G. The results are shown in Table 5.

TABLE 5

| No. | $RuO_2$ (wt %) | $In_2O_3$ (wt %) | $SiO_2$ (wt %) | $TiO_2$ (wt %) | Surface resistance (Ω/□) | Scratch resistance | Pencil hardness | Luminous reflectance (%) |
|---|---|---|---|---|---|---|---|---|
| 31 | 40 | 20 | 0 | 7 | $6.0 \times 10^3$ | Δ | HB | 0.98 |
| 32 | 40 | 13 | 33 | 7 | $5.2 \times 10^4$ | ○ | 4H | 0.25 |
| 33 | 40 | 14 | 32 | 14 | $5.0 \times 10^5$ | ○ | 4H | 0.41 |
| 34 | 40 | 7 | 33 | 13 | $9.5 \times 10^5$ | ○ | 4H | 0.95 |

EXAMPLE 6

$Al(OC_3H_7)_2(C_6H_{10}O_3)$ was dissolved in ethanol so that the concentration would be 3 wt % as $Al_2O_3$, and the solution was designated as solution H. The subsequent operation was conducted in the same manner as in Example 3 except that solution E in Example 3 was changed to solution H. The results are shown in Table 6.

TABLE 6

| No. | $RuO_2$ (wt %) | $In_2O_3$ (wt %) | $SiO_2$ (wt %) | $Al_2O_3$ (wt %) | Surface resistance (Ω/□) | Scratch resistance | Pencil hardness | Luminous reflectance (%) |
|---|---|---|---|---|---|---|---|---|
| 35 | 40 | 20 | 0 | 7 | $9.2 \times 10^3$ | Δ | HB | 0.98 |
| 36 | 40 | 13 | 33 | 7 | $8.2 \times 10^4$ | ○ | 4H | 0.57 |
| 37 | 40 | 14 | 32 | 14 | $7.0 \times 10^5$ | ○ | 4H | 0.55 |

COMPARATIVE EXAMPLE 1

$SnO_2$ having an average particle size of 60Å was pulverized for 4 hours in a sand mill. This solution was heated and peptized at 90° C. for one hour. Then, ethyl silicate was hydrolyzed and added to ethanol so that the concentration would be 3 wt % as $SiO_2$. This solution was added so that the weight ratio of $SnO_2$ to $SiO_2$ would be 2:1. This solution was coated on a glass disk surface of 70 mm in diameter by spin coating for 5 seconds at a rotational speed of 750 rpm and then heated at 450° C. for 10 minutes. Further, on this film, solution B was coated by spin coating for 5 seconds at a rotational speed of 1,500 rpm and heated at 450° C. for 10 minutes. The surface resistance of this coating film was $1 \times 10^8$ (Ω/□), the scratch resistance was X, the pencil hardness was HB, and the luminous reflectance was 0.8%.

COMPARATIVE EXAMPLE 2

$Ti(C_5H_7O_2)_2(OC_3H_7)_2$ was hydrolyzed with an aqueous HCl solution in ethanol so that the concentration would be 3 wt % as $TiO_2$, and the solution thereby obtained was designated as solution I. Solutions A, I and C were mixed so that $RuO_2$ $TiO_2$:$SiO_2$ as calculated as oxides would be 60:6.7:33.3, and the solution thus obtained was coated on a glass disk surface of 70 mm in diameter by spin coating for 5 seconds at a rotational speed of 2,000 rpm and then heated at 450° C. for 10 minutes.

Further, on this film, solution C was coated by spin coating for 5 seconds at a rotational speed of 1,050 rpm and then heated at 450° C. for 10 minutes. The surface resistance of the obtained film was $6.0 \times 10^3$ (Ω/□), the scratch resistance was ○, the pencil hardness was 4H, and the luminous reflectance was 0.34%.

The luminous transmittance (measured by an automatic spectrophotometer MPS2000, manufactured by Shimadzu Corporation) was 70%, which was substantially lower than the luminous transmittance of 80% of Sample No. 4 in Table 1 and the luminous transmittance of 85% of Sample No. 18 in Table 2 (the luminous transmittance of the glass disk having no film formed, was 90%). Thus, the films of Examples were better as low reflection conductive films to be formed on a panel face of a cathode ray tube.

According to the present invention, an excellent low reflection conductive film having high transmittance and high electrical conductivity can be provided efficiently by a simple method such as spraying, spin coating or dipping a substrate in a solution. The present invention is excellent in the productivity, and the apparatus may be relatively inexpensive, since no vacuuming is required. It is adequately applicable to a substrate having a large area such as a panel face of a cathode ray tube, and mass production is possible. Thus, the industrial value of the present invention is very high.

We claim:

1. A conductive film comprising oxides of Ru and In in a weight ratio of from about 8:2 to about 1:9.

2. In a multilayer, reflective film having a conductive film layer and one or more film layers having a refractive index lower than said conductive film layer, the improvement comprising employing as the conductive film a film comprising the oxides of Ru and In in a weight ratio of from about 8:2 to about 1:9.

3. A glass product comprising a glass substrate and the low reflection conductive film of claim 2 formed on the substrate.

4. A cathode ray tube having the low reflection conductive film of claim 2 formed on the surface of a face panel of a cathode ray tube.

* * * * *